United States Patent [19]

Corell

[11] Patent Number: 4,667,438

[45] Date of Patent: May 26, 1987

[54] TOMATO CAGE

[76] Inventor: Andrew J. Corell, Rte. 2, Box 450, Stuarts Draft, Va. 24477

[21] Appl. No.: 811,389

[22] Filed: Dec. 20, 1985

[51] Int. Cl.⁴ .......................................... B21F 29/02
[52] U.S. Cl. ..................................... 47/45; 52/646; 140/3 R
[58] Field of Search ................ 47/45, 47; 52/646; 140/3 R, 25

[56] References Cited

U.S. PATENT DOCUMENTS

| 836,328 | 11/1906 | Maxfield | 47/45 |
| 1,140,448 | 5/1915 | Ellinger | 52/646 |
| 1,659,116 | 2/1928 | McOlvin | 47/47 |
| 3,113,400 | 12/1963 | Emond | 47/45 |
| 3,638,814 | 2/1972 | Lowery | 47/45 |

Primary Examiner—Lowell A. Larson
Attorney, Agent, or Firm—Cushman, Darby & Cushman

[57] ABSTRACT

A tomato cage is provided which can be quickly and easily assembled with no tools at all, or merely a pair of pliers. When disassembled it can be stored in a minimum space, and since there are very few different components, it can be manufactured in a simple manner. A plurality of vertical support posts are disposed at the corners of a polygon; e.g. four support posts are disposed at the corners of a square. Rods interconnect the support posts, apertures being formed in the support posts for receiving a first end of a rod. Only one type of rod need be utilized, having a generally straight first end and having a hook at a second end, each rod extending from an aperture in one post to a position wherein the hook engages another rod adjacent the second post, and so that each rod makes an angle in the range of about 5°-10° with respect to the horizontal. Alternatively, a second type of rod may be provided having a first end like the first ends of the first rods, and having a second end comprising a straight portion generally perpendicular to a straight middle portion of the rod. In this embodiment three first rods and a second rod are provided for each level, with a middle portion of one rod extending through an opening in a keeper washer and the second end of the second rod also extending through the opening in the keeper washer and held in place thereby. Preferably one of the four support posts is driven into the ground up to an indicia line, while the other three, being the same length, rest on the ground.

15 Claims, 17 Drawing Figures

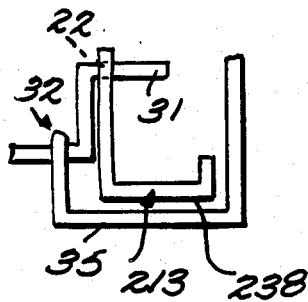
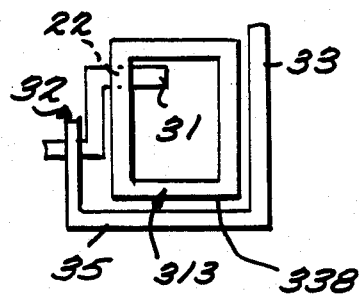
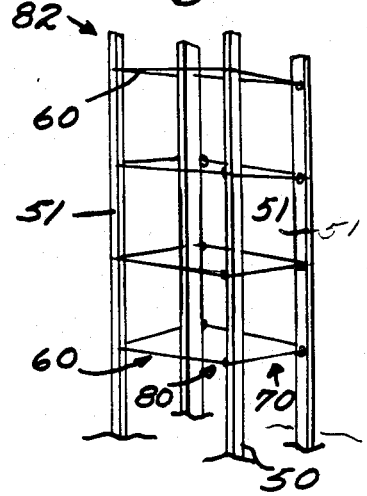
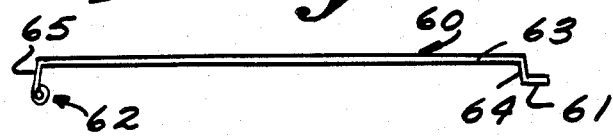
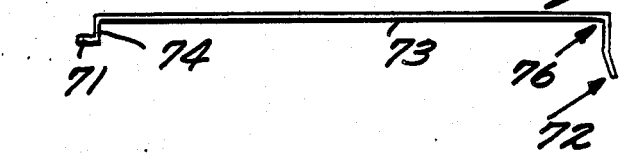
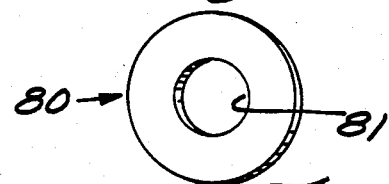
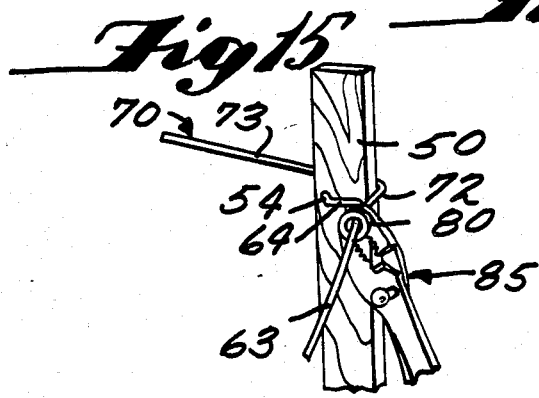
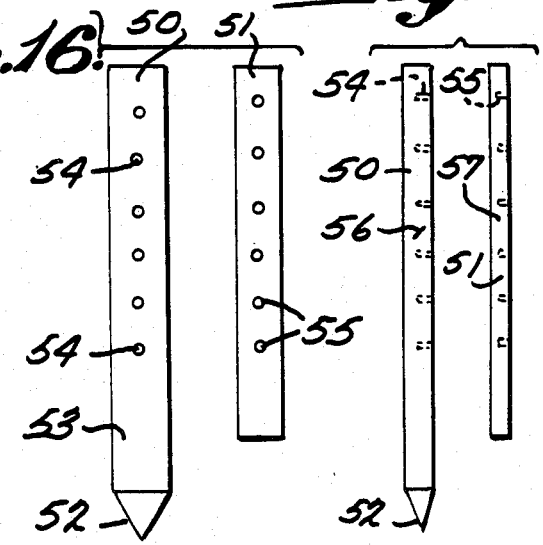

TOMATO CAGE

BACKGROUND AND SUMMARY OF THE INVENTION

When growing a number of different types of plants, but particularly for growing tomatoes outdoors, it is desirable to provide a "cage" for the plant to facilitate proper growth of the plant, and access to desirable parts thereof. For instance when tomatoes grow in association with a cage, the fruit is kept off the ground so that it does not rot, and so that it is readily accessible.

It is desirable to be able to provide a tomato cage, or like plant supporting structure, which has a minimum of parts, and can be assembled quickly, yet when it is disassembled can store in a minimum of space. Most commonly used tomato cages either do not have a low volume configuration for storage, contain a number of different types of component parts, or are relatively difficult to assemble.

According to the present invention, a plant supporting structure is provided which can be quickly assembled either with no tools, or with only a pair of pliers, can equally easily be disassembled, and can be stored in a low volume configuration. The component parts of the structure according to the invention also are simple and easy to construct, and there are a minimum number of different types of parts, further facilitating ease of construction and use.

An exemplary plant supporting structure according to the present invention comprises: a plurality of vertical supports disposed at the corners of an imaginary polygon; a plurality of substantially identically shaped first rods, each having first and second free ends thereof, the second end of each rod shaped to engage another rod; and means defining a plurality of apertures in each of the supports, each aperture for receipt of a first end of a first rod, the apertures being spaced from each other; the first rods extending between the supports to form a cage.

In a first embodiment of the structure according to the invention, the structure consists of the above-recited elements. The apertures of each post are vertically spaced from the apertures of adjacent posts so that the rods, when engaging an aperture with a first end thereof and engaging another rod at a second end thereof, extend at an angle α significantly greater than 0°, with respect to the horizontal. The angle α preferably is in the range of about 5°–10° (e.g. 7.5°), and may be formed either by bending the first end of the rods so that each makes the angle α, or by forming the apertures in the supports so that they make the angle α, or by a combination of bending and angular drilling. The supports may be wooden posts, or metal posts which have at least two sides making a 90° angle with respect to each other (e.g. aluminum or steel angle iron, steel channel, or square tubing).

According to another embodiment of the structure according to the invention, there are also provided a plurality of second rods, and a plurality of keeper washers. For each level of rods extending between the support posts, one rod is a second rod, while the others are first rods. The second rod has a first end for engaging a support aperture, just like for the first rods, but the second end is generally straight, and substantially perpendicular to a straight middle portion of the second rod. The middle portion of one of the first rods extends through the central opening of a keeper washer, and one assembling a cage, using a pliers, bends the second end of the second rod so that it also extends through the central opening of the keeper washer, and is held in place thereby.

It is particularly advantageous to provide four support posts, disposed at the corners of a square, with one of the support posts being longer than the other three. The longer support post has a pointed first end adapting it to be driven into the ground, and has indicia at a predetermined spaced point from the first end, the indicia being provided so that the length of the longer support from the indicia to the second end thereof, opposite the pointed end, is the same as the length of each of the other three posts. In that way one support can be driven into the ground a predetermined distance while the other three supports rest on the ground.

The invention also contemplates the methods of utilization of the two embodiments of structures according to the present invention, to assemble an operable and desirable plant supporting structure.

It is the primary object of the present invention to provide a simple yet effective plant supporting structure which may be easily assembled and disassembled, and stored in a low volume configuration. This and other objects of the invention will become clear from an inspection of the detailed description of the invention, and from the appended claims.

BRIEF DESCRIPTION OF THE DRAWINGS

FIGS. 7 through 10 are top plan detail views illustrating the cooperation between rods and supports of exemplary structures according to the embodiment of FIG. 1, showing four different types of supports that may be utilized;

FIG. 11 is a perspective schematic view of another form of tomato cage according to the present invention;

FIG. 12 is a top plan view of a first rod of the structure of FIG. 11;

FIG. 13 is a top plan view of a second form of rod of the structure of FIG. 11;

FIG. 14 is a perspective view of the keeper washer component of the structure of FIG. 11;

FIG. 15 is a detail perspective view illustrating assembly of the rod of FIG. 13, with the rod of FIG. 12, and keeper washer of FIG. 14, in the construction of a structure of FIG. 11; and FIGS. 16 and 17 are front and side views, respectively, of exemplary supports utilized in the structure of FIG. 11.

DETAILED DESCRIPTION OF THE DRAWINGS

In the first embodiment of a plant supporting structure according to the present invention, illustrated in FIGS. 1 through 10, only very few different types of components are provided, and assembly may be easily effected without the use of any tools. The basic components include a plurality of supports, and a plurality of rods.

Figure 2:
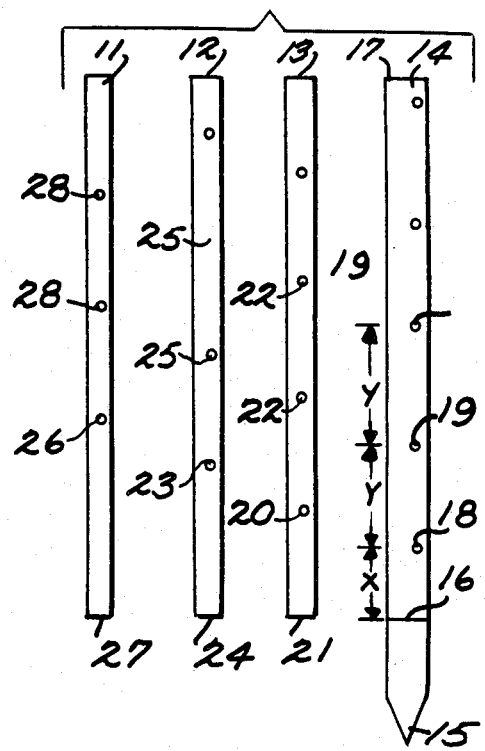
FIG. 2 is a front end view of the support posts of the structure of FIG. 1.
Figure 3:
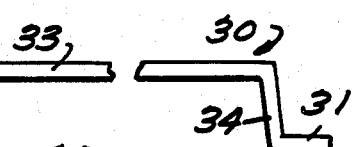
FIGS. 3 through 5 are top plan views of an exemplary rod utilized in the structure of FIG. 1, with the component portions of the rod having various orientations for clarity of illustration.
Figure 4:
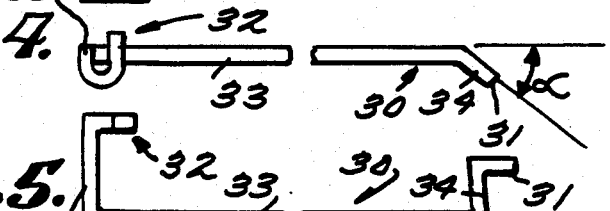
Figure 5:
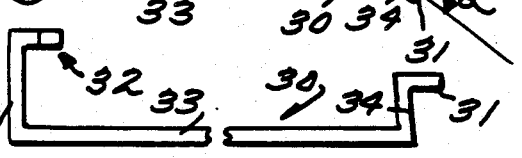
Figure 6:
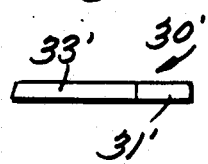
FIG. 6 is a top plan view, like that of FIG. 4, of the first end of another form of rod.
Figure 7:
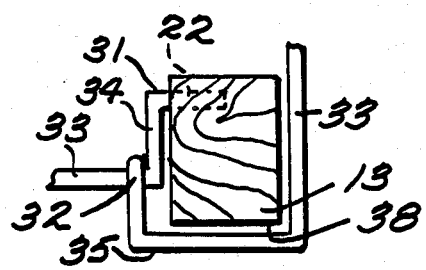
Figure 8:
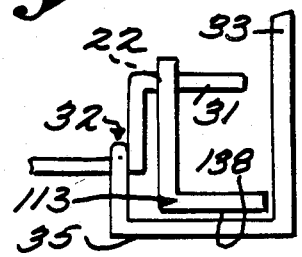

A number of supports are utilized which supports are disposed at the corners of an imaginary polygon and extend upwardly from the ground. In the preferred embodiment illustrated in the drawings the polygon is a square, with four supports being provided, one in each corner of the square, however it is to be understood that other polygon arrangements may also be provided. As illustrated in FIG. 2, there preferably are two types of supports, a first support 11, second support 12, and third support 13, all having the same vertical length, and a fourth support 14. The fourth support 14 has a pointed end portion 15 thereof with indicia—such as the indicia line 16—spaced from the pointed end 15 a predetermined distance, that distance being such that the length of the support 14 from the indicia line 16 to the top end 17 thereof is the same as the length of the other three supports 11 through 13.

Each of the supports has a plurality of apertures, vertically spaced from each other, formed therein. The lowermost aperture 18 of the fourth support 14 is spaced a distance x from the indicia 16, and each of the other apertures 19 of the support 14 are spaced from each other, or the aperture 18, a distance y. The lowermost aperture 20 of the third support 13 is spaced from its lower end 21 thereof a distance equal to $(x+y/4)$, while all of the other apertures 22 thereof are spaced from each other, or the aperture 20, a distance y. For the second support 12 the lowermost aperture 23 thereof is spaced from the bottom 24 thereof a distance equal to $(x+2y/4)$, while the rest of the apertures 25 thereof are spaced from each other, or the aperture 23, a distance y. For the first support 11, the lowermost aperture 26 thereof is spaced from the bottom 27 thereof a distance equal to $(x+3y/4)$, while the rest of the apertures 28 thereof are spaced from each other, or the aperture 26, a distance y. In this way, when the structure is assembled rods extending from one support to the next make an angle $\alpha$ with respect to the horizontal, which angle is determined by the dimensions x, y. A typical embodiment of the invention, $x=7$ inches, while $y=8$ inches.

Figure 1:
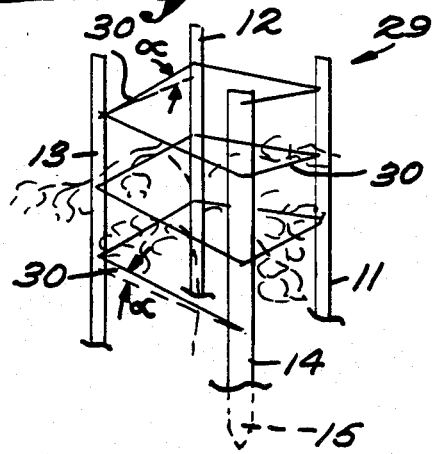
FIG. 1 is a perspective schematic view of the first embodiment of an exemplary plant supporting structure according to the present invention.

The second type of component of the plant supporting structure 29 illustrated in FIG. 1 comprises a plurality of rods, shown generally by reference numeral 30. All of the rods 30 are substantially identical and include a first substantially straight end portion 31 thereof, a substantially straight middle portion 33, and a second end portion 32, preferably in the form of a hook, which is adapted to engage and hold another rod. The first end portion 31 is spaced, or offset, from the straight middle portion 33 by the offset portion 34, while the second end 32 extends generally parallel to the middle portion 33 and toward the first end 31, and is connected to the middle portion 33 by a spacer portion 35.

In one modification of the rod 30, the first end portion 31 thereof makes an angle $\alpha$ (see FIG. 4) with respect to the middle portion 33 thereof. This angle $\alpha$ is the slope with respect to the horizontal that each rod 30 will have when extending from one support to the other. In a second modification of the rod 30' (see FIG. 6) the first end portion 31' thereof is co-planar with the middle portion 33. In this embodiment, the apertures (18, 19, 20, 22, 23, 25, 26, 28) are formed so that they are disposed at the angle $\alpha$ with respect to the horizontal. The angle $\alpha$ preferably is in the range of about 5°–10°, most desirably 7°, 30 minutes.

FIGS. 7 through 10 illustrate the interconnections between two rods 30 according to the present invention in association with a support post 13. In the FIG. 7 embodiment the support post 13 is of wood, while in FIG. 8 the support post 113 is a steel or aluminum angle, in FIG. 9 the support 213 is a steel channel, and in FIG. 10 the support 313 is a square tubing. Note that in each embodiment the dimension of the spacer portion 35 of the rod 30 is greater than the dimension of the side 38 (138, 238, 338, respectively) of the cooperating post 13 (113, 213, 313, respectively).

In an exemplary manner of assembling the plant supporting structure 29 of the FIGS. 1 through 10 embodiment, the pointed end 15 of the support 14 is driven into the ground up to the level of the indicia line 16. A first end 31 of one of the rods 30 is then inserted into aperture 18, and so that the second end 32 thereof extends toward the support 13, which has the bottom 21 thereof resting on the ground at the corner of a square to be defined by the supports 11 through 14. The first end 31 of a second rod 30 is inserted in the aperture 20, while at the same time the second end 32 of the rod extending from the aperture 18 hooks a middle portion 33 of the second rod adjacent the first end 31 thereof (see FIG. 7). The second rod extending from the aperture 20 extends toward the second support 12, at which point it engages a third rod which has the first end thereof received by aperture 23, and the third rod second end extends toward the first support 11 and engages a fourth rod having the first end 31 thereof received by the first aperture 26 of the first support 11. The fourth rod extends toward the first aperture 19 of the support 14, and a zigzag arrangement of the support rods 30 continues in the manner illustrated in FIG. 1. While the first rod, received by the aperture 18, will not have the hook portion of another rod engaging it, and while the last rod extending from the uppermost aperture 19 in the fourth support 14 will not be supported at the second end thereof, the entire structure 29 will be very stable. The structure may be disassembled as easily as it is assembled, and stored in a low volume configuration.

The second embodiment of a plant supporting structure according to the present invention is illustrated in FIGS. 11 through 17. In this embodiment, the supports 50, 51 can be the same as the supports 11 through 14 except that in this case all of the cooperating apertures of each of the supports are co-planar, in a generally horizontal plane. For instance as illustrated in FIGS. 16 and 17, two different types of supports can be provided, one support 50 and three supports 51. The support 50 has a pointed first end 52 thereof, and an indicia line 53. The apertures 54 in the support 50 are in vertical alignment with cooperating apertures 55 in the supports 51.

In the embodiment of FIGS. 11 through 17, two different types of rods are provided. The first type of rod, illustrated generally by reference numeral 60, is best seen in FIG. 12 and is essentially the same as the rods 30' of the first embodiment. That is each rod 60 has a first generally straight end 61 thereof which is substantially co-planar with a straight middle portion 63 thereof, and has a hook shaped second end 62 thereof. The first end 61 is off-set from the middle portion 63 by the off-set portion 64, while the second end 62 is spaced from the middle portion 63 by the spacer portion 65, the spacer portion 65 having a greater dimension than the dimension of the faces 56, 57 of the supports 16, 17.

A second type of rod is shown generally by reference numeral 70, and is most clearly seen in FIG. 13. The second type of rod has a first end 71 thereof substantially identical to the first end 61 of the rod 60, including the off-set portion 74, and has a middle portion 73 substantially identical to the middle portion 63 of the rod 60. The difference between the rod 70 and the rod 60 is in the second end 72 thereof, which is substantially straight, making generally a 90° angle, illustrated by reference numeral 76, with respect to the middle portion 73.

In the embodiment of FIGS. 11 through 17, another component comprises keeper washers 80 (see FIG. 14). Each of the washers 80 is a conventional steel or aluminum washer, which has a through-extending opening 81 therein.

In the assembly of the plant supporting structure 82 of FIG. 11, the pointed end 52 of the support 50 is driven into the ground up to the indicia line 53. Then the first end 61 of a rod 60 is inserted in the lowermost aperture 54 thereof, with the second end 62 thereof extending toward another support 51. At the other support 51 the second end 62 of the rod 60 passes around the support 51 so that the spacer 65 is adjacent a side face 57 thereof, and then the second end 62 engages a middle portion 63 of another rod 60, adjacent the first end 61 thereof, that first end 61 being received within an aperture 55 in the support 51. Three rods 60 are used for each level of rods, and one rod 70. The middle portion 63 of the first of the rods 60 is passed through the central opening 81 in a washer 80 (see FIG. 15) prior to insertion of the end 61 thereof into the aperture 54, and then when the second end 72 of the second type of rod 70 passes around the support 50, the assembler engages that end 72, as well as the middle portion 63 of the rod 60, with a pliers 85 (see FIG. 15) to deform the end 72 so that it is in alignment with the central opening 81 of the washer 80, so that the washer 80 is slipped thereover and holds the end 72 adjacent the middle portion 63 so that that level of rods is secured in a generally horizontal plane (see FIG. 11).

The above steps are repeated for each other level of rods 60, 70, only it is preferred that in each level the position keeper washer 80 is off-set 90° with respect to the levels on either side thereof. This embodiment too can be easily and quickly assembled and disassembled, and stored in a low volume configuration.

It will thus be seen that according to the present invention a simple readily assemblable, and disassemblable, plant supporting structure has been provided, which is capable of being stored in a low volume configuration. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A plant supporting structure comprising:
    a plurality of vertical supports in the form of posts disposed at the corners of an imaginary polygon;
    a plurality of substantially identical shaped first rods, each having first and second free ends thereof, said second end of each rod shaped to engage another rod; and
    means defining a plurality of apertures in each of said posts, each aperture for receipt of a first end of a first rod, the apertures being spaced from each other; said first rods extending between the posts to form a cage;
    said apertures of each post being vertically spaced from comparable apertures of adjacent posts so that said rods, when engaging said apertures at said first ends thereof, and engaging an adjacent rod at second ends thereof, each extending in a direction such that it makes a predetermined angle $\alpha$ with respect to the horizontal of significantly greater than 0 degrees, said angle $\alpha$ being formed by the ending of the first end of each rod so that it makes the angle with respect to a straight middle portion of the rod,
    said second end of each rod comprising a hook portion, said hook portion engaging an adjacent rod, and said hook portion extending generally parallel to said middle portion and towards said first end of said rod, and a spacer portion of said rod connecting said middle portion and said hook portion, said spacer portion having a dimension greater than any dimension of a support which extends generally parallel to said apertures.

2. A structure as recited in claim 1 wherein the angle $\alpha$ is in the range of about 5°–10°.

3. A structure as recited in claim 1 wherein the angle $\alpha$ is formed by disposing the apertures in each of said supports at said angle with respect to the horizontal, and wherein the first end of each rod is substantially co-planar with respect to a straight middle portion thereof.

4. A structure as recited in claim 3 wherein the angle $\alpha$ is in the range of about 5°–10°.

5. A structure as recited in claim 1 wherein all of said supports, except one, are of substantially the same length, and wherein the last support is of a substantially greater length, and has a pointed end portion and indicia spaced from said pointed end portion a distance such that the length of said last support from said indicia to the end thereof opposite said pointed end is the same as the length of each of said other supports, so that during use said last support is driven into the ground up to the indicia, and the rest of the supports rest on the ground.

6. A structure as recited in claim 1 wherein said supports comprise wooden posts.

7. A structure as recited in claim 1 wherein said supports comprise metal posts, each metal post having at least two sides, which sides are disposed at an angle of about 90° with respect to each other.

8. A structure as recited in claim 1 wherein said plurality of supports comprises four supports disposed at the corners of a square.

9. A plant supporting structure comprising:
    a plurality of vertical supports in the form of posts disposed at the corners of an imaginary polygon;
    a plurality of substantially identical shaped first rods, each having first and second free ends thereof, said second end of each rod shaped to engage another rod; and
    means defining a plurality of apertures in each of said posts, each aperture for receipt of a first end of a first rod, the apertures being spaced from each other; said first rods extending between the posts to form a cage;
    said apertures of each post being vertically spaced from comparable apertures of adjacent posts so that said rods, when engaging said apertures at said first ends thereof, and engaging an adjacent rod at second ends thereof, each extending in a direction such that it makes a predetermined angle α with respect to the horizontal of significantly greater than 0 degrees, the angle α being formed by disposing the apertures in each of said supports at said angle with respect to the horizontal, and wherein the first end of each rod is substantially co-planar with respect to a straight middle portion thereof, said second end of each rod comprising a hook portion, said hook portion engaging an adjacent rod, and said hook portion extending generally parallel to said middle portion and towards said first end of said rod, and a spacer portion of said rod connecting said middle portion and said hook portion, said spacer portion having a dimension greater than any dimension of a support which extends generally parallel to said apertures.

10. A plant supporting structure comprising:
a plurality of vertical supports disposed at the corners of an imaginary polygon;
a plurality of substantially identical shaped first rods, each having first and second free ends thereof, said second end of each rod shaped to engage another rod; and
means defining a plurality of apertures in each of said supports, each aperture for receipt of a first end of a first rod, the apertures being spaced from each other; said first rods extending between the supports to form a cage;
said structure further comprising a plurality of shaped second rods, and a plurality of keeper washers,
said first and second rods being disposed in levels interconnected to each other and said supports, in each level there being provided one of said rods, and the rest being first rods, said keeper washer having a through-extending opening therein through which one of said first rods passes, and through which a second end of said second rod passes.

11. A structure as recited in claim 10 wherein each of said first rods has a substantially straight middle portion, and wherein said first end thereof is substantially straight, and wherein said second end thereof includes hook shaped member extending generally parallel to said middle portion and toward said first end, and further comprising a spacer portion interconnecting said hook shaped portion and said middle portion, said spacer portion having a dimension greater than the dimension of any of said posts parallel to said apertures; and wherein said second rods each have a substantially straight middle portion, and a straight first end portion, and a substantially straight second end portion which makes an angle of about 90° with respect to said middle portion.

12. A structure as recited in claim 11 wherein four supports are provided, and wherein said keeper washer at each level is off-set about 90° with respect to the keeper washers of adjacent levels.

13. A structure as recited in claim 12 wherein three of said support posts are of substantially the same length, and the fourth of said support posts is longer than the other three, having a pointed end portion which is adapted to penetrate the ground, and having indicia spaced from said pointed end portion, said indicia spaced from said pointed end portion so that the length of said support from said indicia to the end of said support opposite said pointed end is substantially equal to the length of each of said other supports, so that said pointed first end of said fourth support penetrates the ground and said fourth support is disposed in the ground up to said indicia, while the other three supports rest on the ground.

14. A method of assembling a plant supporting structure utilizing four—first, second, third, and fourth—vertically extending supports, the fourth support having a pointed end and a length greater than the other supports, and indicia disposed a predetermined distance from said pointed end so that the length of said fourth support from said indicia to the end thereof opposite said pointed end is the same as the length of the other supports; a plurality of substantially identical rods each having a first generally linear end portion, a substantially straight middle portion, and a hook formed at a second end thereof, said hook extending generally parallel to said middle portion and toward said first end, and a spacer portion being provided connecting said hook to said middle portion, said spacer portion having a dimension greater than the side dimensions of said supports; and a plurality of apertures disposed in each of the supports, the lowest aperture in the fourth support being spaced from the indicia a distance x, and all of the apertures of any support being vertically spaced from each other a distance y, and the lowermost aperture of the third support being spaced from the bottom end thereof a distance equal to $(x+y/4)$, and wherein the lowermost aperture in the second support is spaced from the bottom end thereof a distance equal to $(x+2y/4)$, and wherein the lowermost aperture of the first support is spaced from the bottom end thereof a distance equal to $(x+3y/4)$; the method comprising the steps of:
inserting the first end of one of the rods in the lowermost aperture of the fourth support and so that the second end thereof extends toward the third support; inserting the first end of a second rod in the lowermost aperture of the third support while hooking the second end of the first rod around the second rod adjacent the first end thereof, the second end of the second rod extending toward the second support; and repeating these steps until each support is connected to each other adjacent support by a plurality of rods, each of the rods making an angle of significantly greater than 0° with respect to the horizontal.

15. A method of forming a plant supporting structure utilizing four support posts each having a plurality of apertures formed therein, the apertures in each support post being vertically aligned with apertures of the other three support posts, and the apertures in each support post being vertically spaced a predetermined distance with respect to the other apertures in that support post, and further utilizing a plurality of rods including first rods having a substantially straight first end and hook formed at a second end, and seconds rods wherein each second rod has a first end comparable to the first end of the first rods, and a generally straight second end which makes an angle of about 90° with respect to a straight middle portion of the second rod, and a plurality of keeper washers each having a through-extending opening therein, the method comprising the steps of:
disposing the four support posts so that they operatively engage the ground and are disposed at the corners of a square; using three of the first rods and one of the second rods, inserting a first end of each rod in an aperture of one of the posts, so that a second end of the rod extends toward another post and a hook at the second end thereof, in the case of the first rods, engages another rod, so that four rods are disposed in a generally horizontal plane interconnecting the four posts; passing the middle portion of one of the first rods through the central opening of a keeper washer prior to insertion of the first end of that rod into an aperture of a post; and passing the second end of the second rod through the central opening in the washer so that the washer holds the second rod in place; and repeating the above steps for a plurality of different levels of rods, and so that the portion of the rods of each level containing the keeper washer is off-set about 90° from each adjacent level.

* * * * *